Oct. 6, 1931.   W. J. F. FORWARD ET AL   1,825,721
MILLING MACHINE
Filed Sept. 15, 1927    6 Sheets-Sheet 6
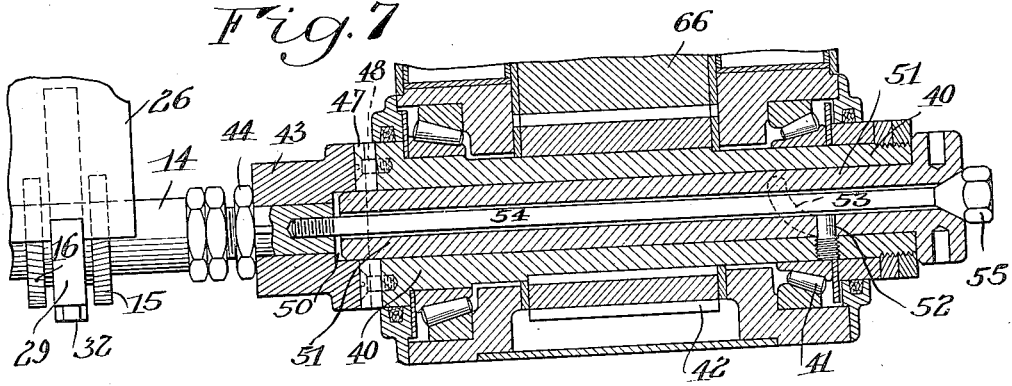
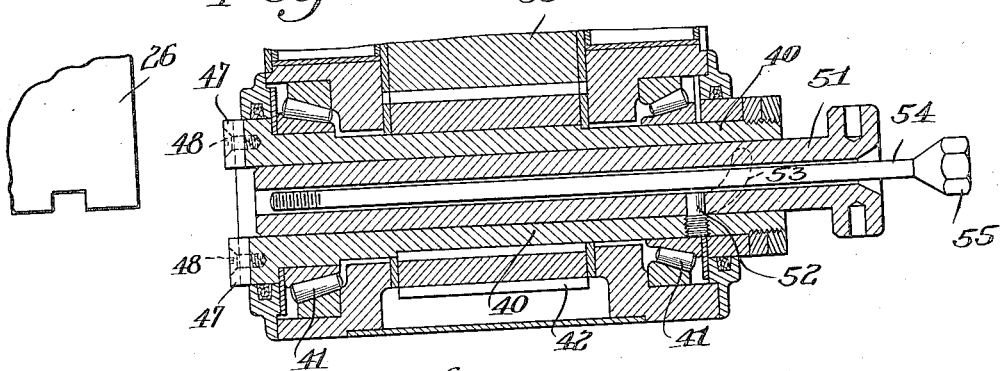
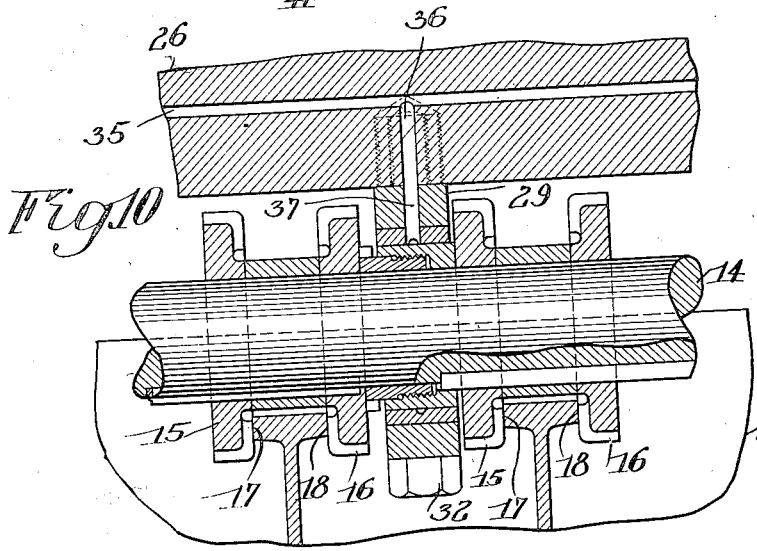
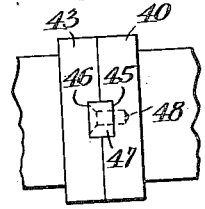
INVENTORS
Worthy J. F. Forward
Roland Russell Roberts
BY Harold E. Stonebraker
their ATTORNEY Patented Oct. 6, 1931

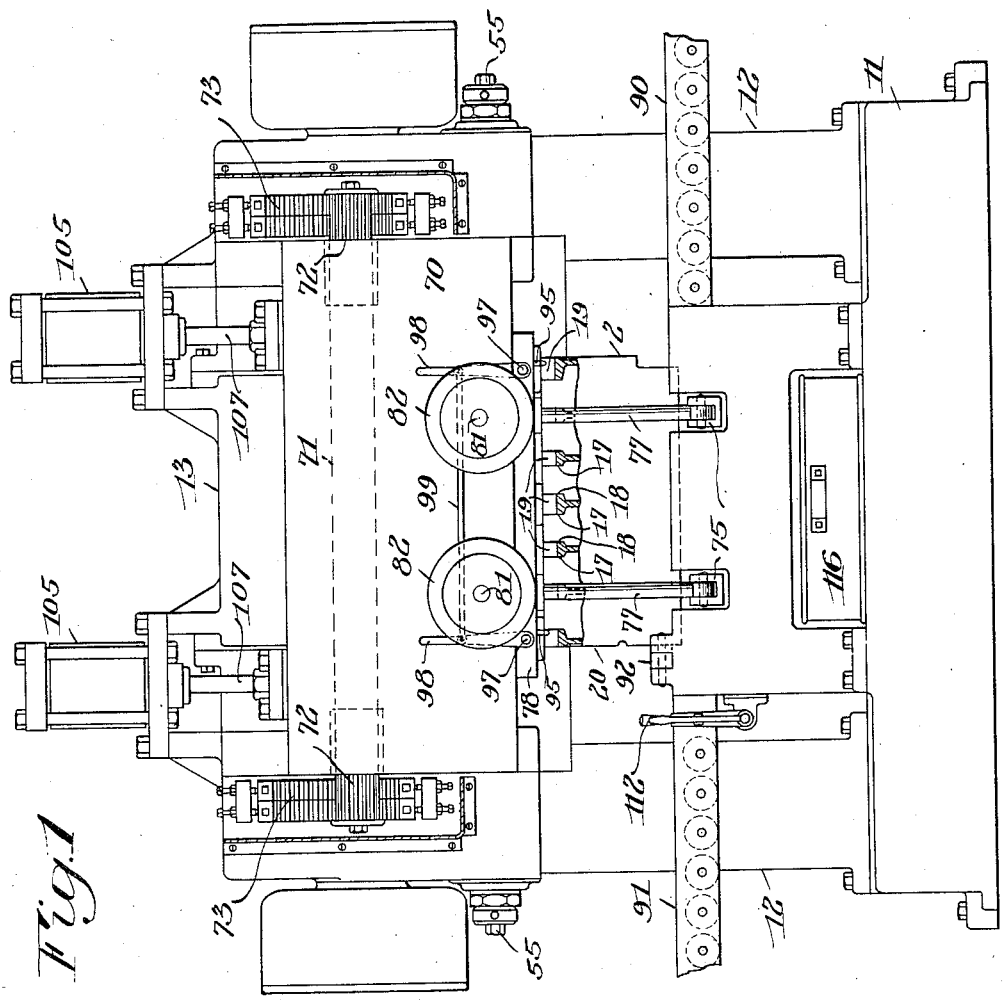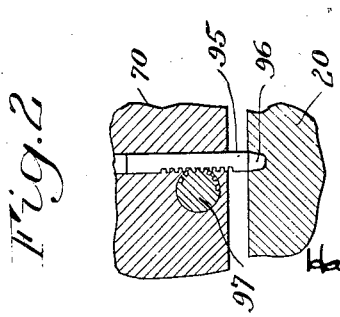

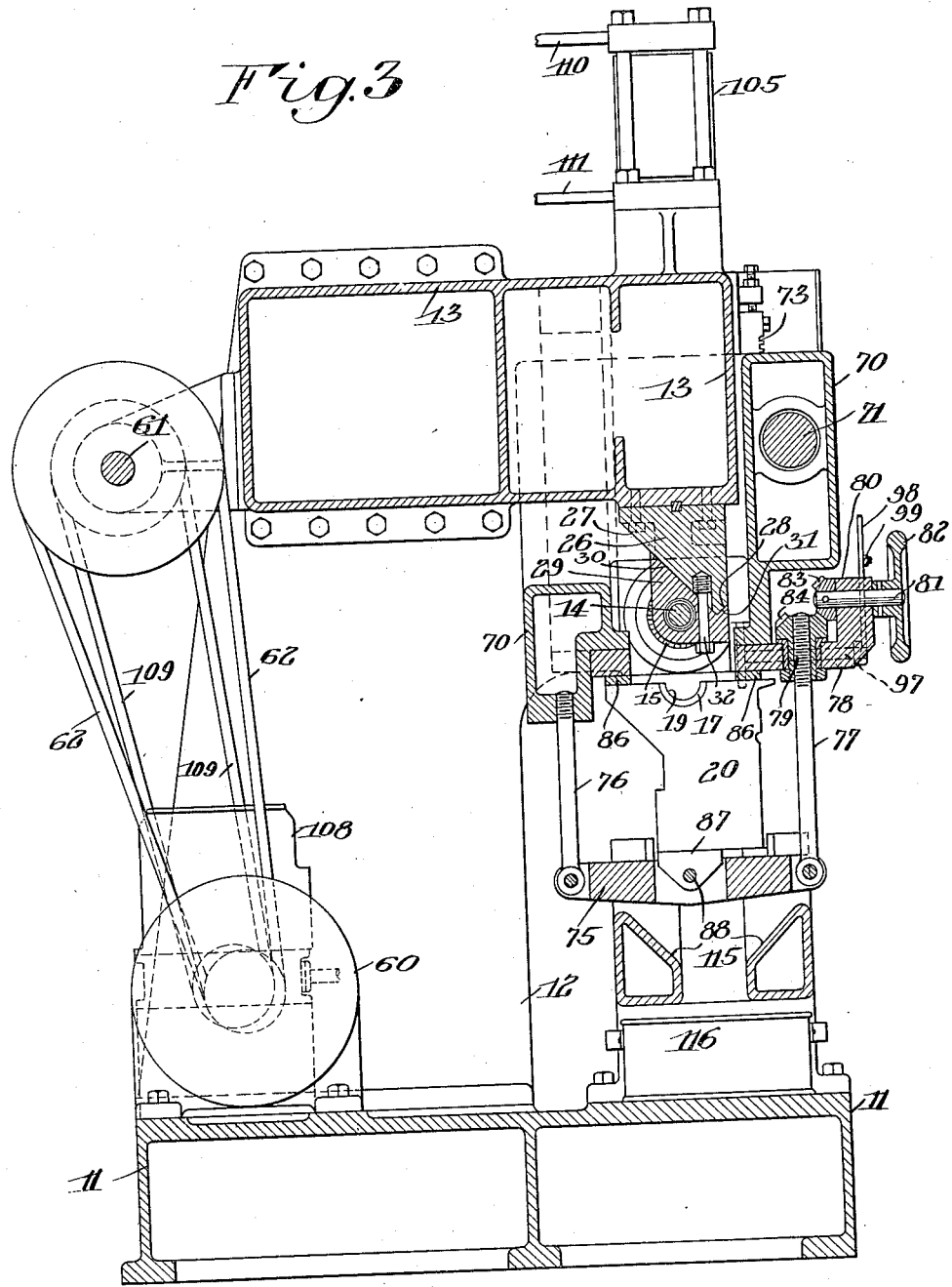

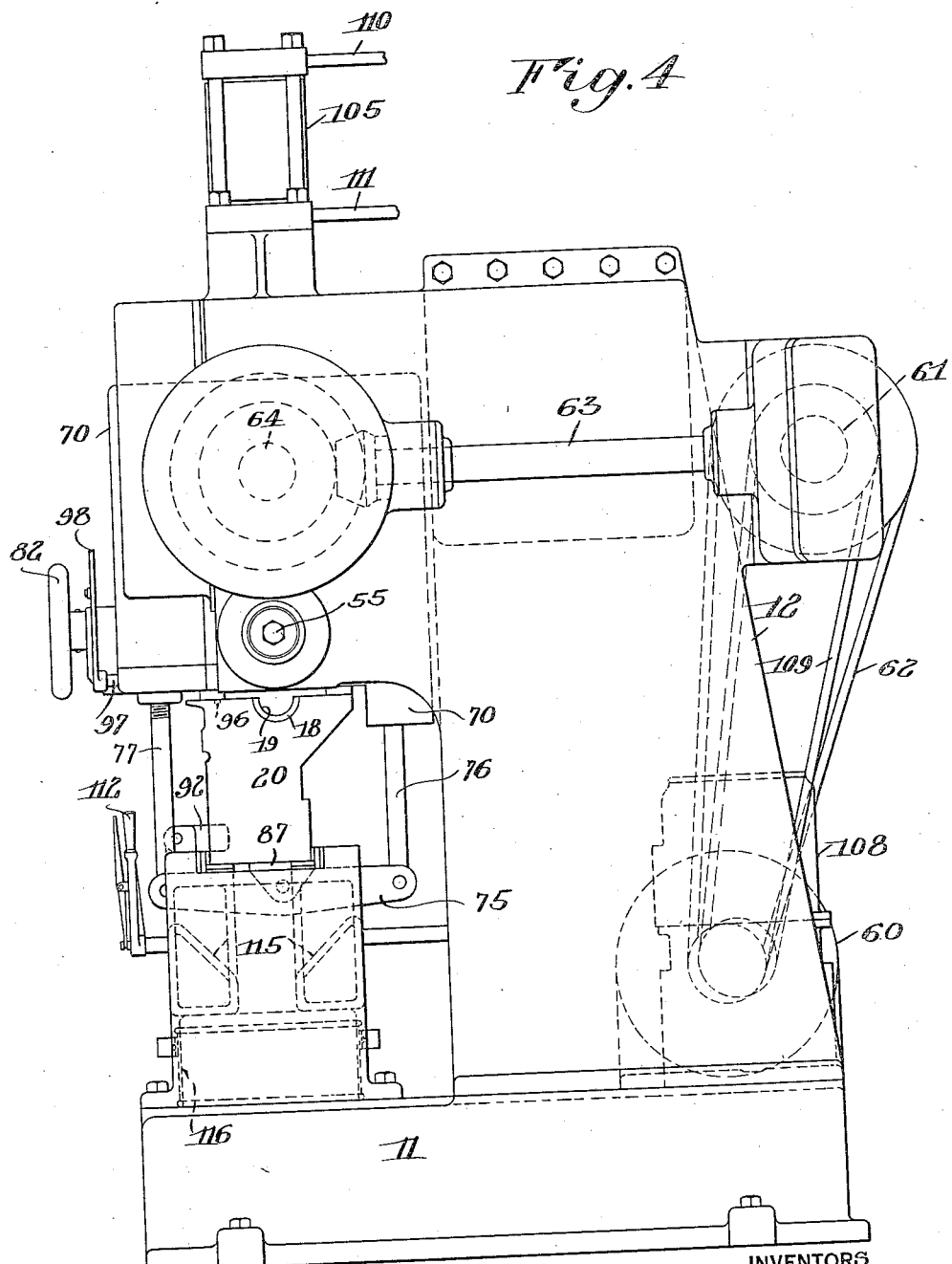

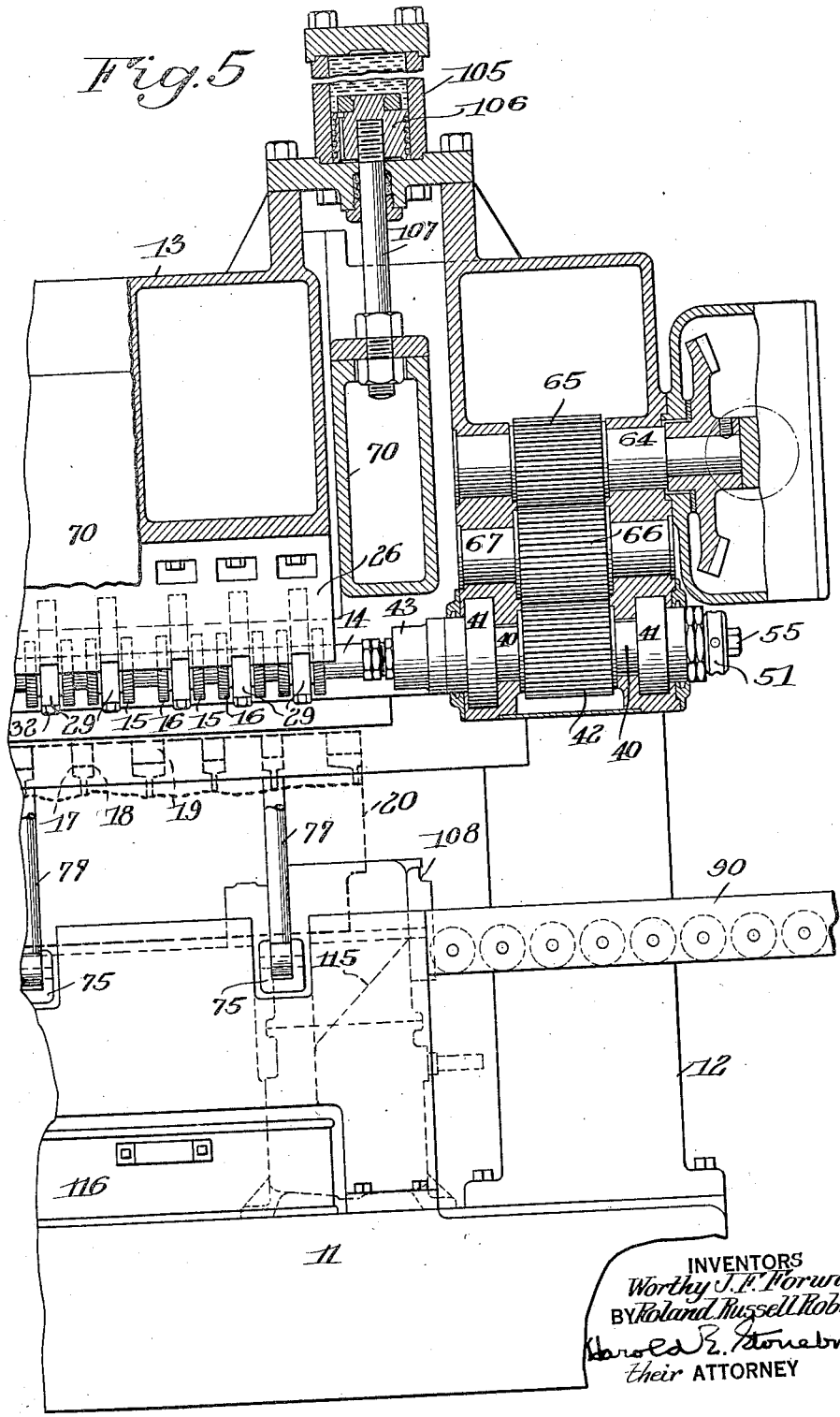

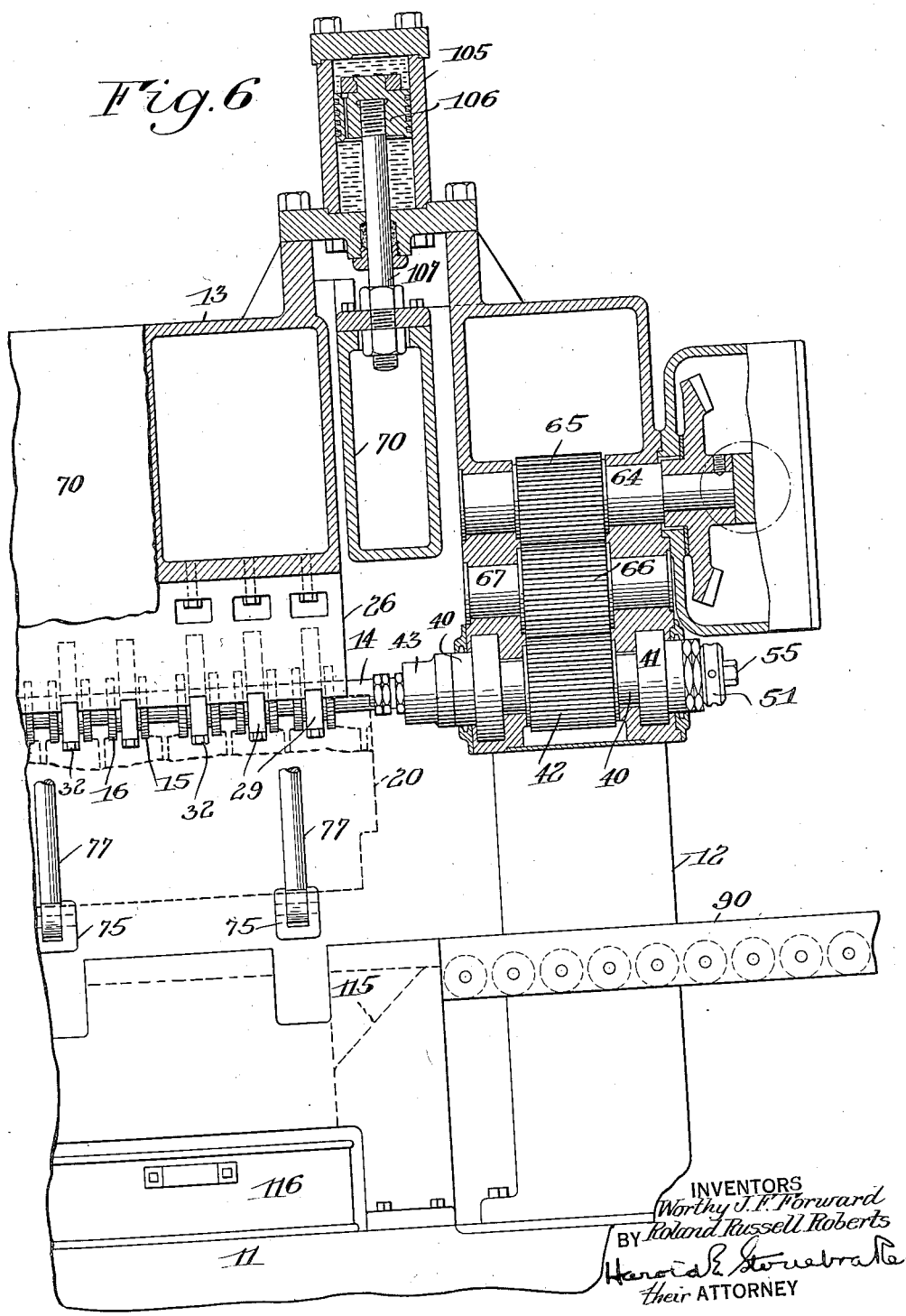

1,825,721

UNITED STATES PATENT OFFICE

WORTHY J. F. FORWARD AND ROLAND RUSSELL ROBERTS, OF ROCHESTER, NEW YORK, ASSIGNORS TO CONSOLIDATED MACHINE TOOL CORPORATION OF AMERICA, OF ROCHESTER, NEW YORK, A CORPORATION OF DELAWARE

MILLING MACHINE

Application filed September 15, 1927. Serial No. 219,742.

This invention relates to a machine tool such as a milling machine, and has for its principal object to provide a generally improved machine in which the work may be finished more expeditiously and with greater accuracy than in the machines heretofore known.

Another object of the invention is to provide an improved form of clamping mechanism for holding the work.

An additional object is to provide a machine in which the work is located below the milling cutters or other tools, while the guideways which guide the travel of the work and the means for moving the work are all located above the tools, thus preventing chips from falling into the guideways or elevating means.

A further object of the invention is to provide simple and effective hydraulic mechanism for moving the work relative to the tool so as to bring them into cooperative relationship with each other.

Still another object is to provide mechanism for locating the work accurately with respect to the frame in which it is clamped.

An additional object is to provide improved bearings for the spindle of the machine, which may be alined quickly and easily.

A still further object of the invention is to provide driving mechanism for the spindle of such a nature that the spindle may be removed easily and in a minimum of time.

Still another object is to provide driving means for the spindle so that it may be driven from a plurality of points or so that a plurality of separate spindles may be used if desired without change in the driving mechanism.

With these and other ends in view, the invention comprises the structure and combination of parts which will appear more clearly from the following description when read in conjunction with the accompanying drawings, the novel features being pointed out in the claims following the description.

In the drawings:

Figure 1 is a front elevation of a machine tool in the nature of a milling machine, showing one possible embodiment of the invention applied thereto;

Figure 2 is a fragmentary sectional view showing the details of a work locating pin;

Figure 3 is a transverse vertical section taken approximately centrally through the machine, looking toward the right;

Figure 4 is an elevation of the right hand end of the machine;

Figure 5 is a fragmentary front elevation of the right hand portion of the machine with parts in section, showing the work holding mechanism in its loading and unloading position;

Figure 6 is a view similar to Figure 5 showing the work holding mechanism elevated to the top of its travel at the completion of the milling operation;

Figure 7 is a longitudinal sectional view through a part of the spindle drive showing the spindle in place;

Figure 8 is a view similar to Figure 7 showing the spindle removed;

Figure 9 is a plan of the connection between the spindle and the driving mechanism, and Figure 10 is a longitudinal section through one of the spindle bearings.

The invention has been disclosed in connection with a milling machine designed especially for milling the edges of the bearings of an engine block. It is obvious, however, that many of the details disclosed herein are applicable not only to other types of milling machines, but also to machine tools of widely different forms.

The machine shown in the drawings comprises a bed plate 11 carrying near each end an upright standard 12, these standards being connected near their tops by the frame members 13. An arbor or spindle 14, carrying several pairs of milling cutters 15 and 16, extends lengthwise of the machine, these milling cutters being adapted to finish the edges 17 and 18 of the bearings 19 in the engine block 20, when this engine block is elevated by mechanism hereafter described, so as to bring the bearings into cooperative relationship with the milling cutter.

Various arrangements might be employed for supporting this spindle or arbor at suitable intervals throughout its length. The mechanism here illustrated for that purpose comprises a supporting member 26, having a generally triangular cross-section, extending along the under side of the frame member 13 and rigidly attached thereto, as shown in Figure 3. This supporting member 26 has a slanting face 27 parallel to and spaced from the spindle 14, and one corner of the generally triangular body is cut off so as to form another face 28 at an angle to the face 27.

To support the spindle 14 from this member 26, there may be employed one or more bearing blocks 29 having the irregular shape shown in Figure 3. The spindle is journalled in these blocks (see also Figure 10), and the blocks are so shaped that they have a surface 30 in contact with the surface 27 of the supporting member 26, and a second surface 31 in contact with the other surface 28 of the supporting member. Thus the bearing block has a recessed portion which receives the angular edge portion of the supporting member, and this construction effectively locates the bearing block in proper position upon the supporting member easily and quickly. To aline a bearing block accurately, it is necessary only to place the side 30 of the block in contact with the surface 27 of the supporting member, and then to slide the block along that surface until its motion is stopped by the surface 31 of the block coming into contact with the surface 28. The block is then properly alined, and may be secured to the supporting member by any suitable means such as the bolt or lag-screw 32. It will be noted from Figure 3 that the bolt 32 passes between the spindle 14 and the angular corner of the supporting member, and it will also be seen that the direction of this bolt is such that its tension tends to keep the block tight against both surfaces 27 and 28, thus holding the block effectively in perfect alinement.

Lubrication of the bearings may be obtained easily by providing an oil duct 35 through the supporting member 26, as shown in Figure 10, suitable lateral ducts 36 leading from this main duct 35 and being in alinement with oil ducts 37 extending through the bearing blocks 29 to the desired points.

In order to drive the spindle 14 so as to rotate the milling cutters 15 and 16, various forms of mechanism might be employed. It is desirable, however, to use driving means of such a construction that the spindle may be removed easily and quickly, without taking apart the driving mechanism, because the milling cutters become dull and it is necessary to replace them at intervals. The driving means herein disclosed fulfills these requirements effectively.

A driven member 40, rotatably mounted in suitable bearings 41, is placed in axial alinement with the spindle 14, preferably at each end thereof. This driven member may be rotated through a pinion 42 secured on the member, the connections for driving this pinion being described below. On the end of the spindle 14, adjacent the driven member 40, may be keyed a sleeve 43, shown especially in Figures 7 and 9, this sleeve being so placed that it abuts the end of the member 40. A nut 44, engaging a threaded portion of the spindle, may be used to bear against the left-hand end of the sleeve 43, so as to hold it against the driven member 40 and prevent it from moving leftward away from this member.

To provide a driving connection between the driven member 40 and sleeve 43 on the spindle 14, a transverse keyway 45 may be cut across the end of the member 40, at right angles to the longitudinal axis thereof, and a corresponding keyway 46 may be formed in the sleeve 43. A key 47 may be placed in these keyways and secured to the member 40 by screws 48, so that it will remain in place when the spindle is removed. It is obvious that this construction will permit the spindle 14 to be moved transversely, at right angles to its longitudinal axis, or in the direction of the keyways 45 and 46, thus effecting separation of the spindle from the driven member 40.

In order to hold the spindle in alinement with the member 40 except when it is desired to remove it, various devices may be employed.

In the mechanism here illustrated, the driven member 40 is made hollow or of tubular form, while a recess 50 is provided in the end of the sleeve 43 on the spindle 14. Thus the spindle has, in effect, a recess in its end, in alinement with the opening through the member 40, as is shown clearly in Figure 7. Within the opening in the member 40 is a retaining member, which may be in the nature of a tubular plug 51, movable relative to the member 40, and projectable at will into the recess 50 in the spindle. When this retaining member 51 is moved to the left (when viewing it as in Figures 7 and 8) so as to extend into the spindle, it is obvious that the spindle is held in alinement with the driven member 40, and is prevented from being disengaged by the transverse movement above described. This relationship of the parts is illustrated in Figure 7.

The retaining member 51 could be moved to the right, in order to permit the spindle to be removed, in various ways. One possible construction for accomplishing this consists of a pin 52 fixed to the member 40 and projecting into a spiral cam slot 53 formed in the retaining member 51. Suitable wrench sockets may be formed at the right hand end of the retaining member, so that a spanner wrench may be used to turn this member. When the retaining member 51 is turned in one direction relative to the driven member 40, the coaction of the pin 52 with the cam slot 53 will result in moving the retaining member lengthwise, projecting it from the member 40 into the recess 50 in the spindle. If the retaining member be turned in the other direction, however, it will be withdrawn from the recess in the end of the spindle, thus taking a position such as that shown in Figure 8.

In order to hold the retaining member 51 in its normal or first position mentioned above, in which it projects into the spindle, locking means may be employed. As an illustration of such locking means, there is shown a rod 54 passing through the opening in the tubular retaining member 51, and being threaded into a tapped opening in the end of the spindle 14. The outer end of this locking rod 54 has an enlarged head 55 which engages the end of the retaining member 51 when the locking rod is screwed into position, as shown in Figure 7. As long as this rod remains screwed firmly into the end of the spindle, it is obvious that the retaining member 51 is held in its normal position. In order to move the retaining member to its ineffective position, it is first necessary to unscrew the locking rod 54 and to pull it far enough outwardly so that the outward movement of the retaining member is not obstructed. This position is shown in Figure 8.

The operation of removing a spindle from the machine may be summarized as follows: Assuming that the spindle is in place, and that all of the bearing blocks 29 are firmly attached to the supporting member 26, the first step in the removal of the spindle is to loosen the gearing blocks by removing the bolts or lag-screws 32. When all of the bearing blocks have thus been freed from the supporting member, the spindle is supported only at its ends, through the connection with the driven members 40 at each end of the spindle.

Next the locking rod 54 is unscrewed by applying a wrench to the head 55 thereof, and the rod is pulled out to the position shown in Figure 8. A spanner wrench may then be applied to the retaining member 51, and the rotation of this member in the proper direction will cause it to move longitudinally outward, on account of the reaction between the pin 52 and the cam slot 53. When the retaining member has reached the position illustrated in Figure 8, it no longer projects into the recess in the spindle, and the spindle is free to be removed. It may be necessary to back off the nut 44 slightly, so that the sleeve 43 may move a short distance away from the abutting surface of the driven member 40, in order to reduce friction between these parts. If the spindle is turned so that the keyways 45 and 46 extend approximately vertically, it may then be dropped downward in the direction of the keyways, thus freeing it from the machine. To replace the spindle, the operation is reversed.

It will be seen that this improved spindle driving mechanism has many advantages over the conventional drives heretofore used. In addition to enabling the spindle to be removed easily and quickly, the same driving mechanism may be used without change to drive two spindles in axial alinement with each other instead of having a single spindle extend all the way across the machine. One spindle could be connected to the driven member 40 at the right hand side of the machine, and could extend to the middle of one of the bearing blocks 29, preferably the block closest to the center of the machine. The other spindle could be connected to the driven member 40 at the left hand end of the machine and could extend rightwardly to the end of the first spindle. When using two spindles in this manner, the connection between each of the spindles and the corresponding driven member 40 would be exactly the same as above described. Therefore, the user of a machine equipped with this improved spindle driving mechanism could use either a single spindle extending all the way across the machine, or two spindles each extending half way across the machine, as he might desire, without making any other change in the machine.

It has been stated above that each driven member 40 was rotated by driving the pinion 42 mounted thereon. One possible form of mechanism for driving these pinions 42 will now be described.

By referring to Figures 3 and 4, it will be seen that a suitable driving motor 60 may be mounted upon the rear portion of the base plate 11. Secured to the frame of the machine above the motor, there may be a horizontally disposed shaft 61 extending along the back of the machine from one end to the other, this shaft being driven from the motor in any desired manner, such as by the belt 62. At each end of the machine there may be a cross shaft 63 approximately perpendicular to the shaft 61 and extending forwardly across the end of the machine to a point near the front thereof. Each of the shafts 63 may be driven in any suitable manner, such as by bevel gears, from the shaft 61.

Driving connections of many possible forms might be provided between the cross shafts 63 and the driven members 40. As an illustration of such driving connections, there is shown a short shaft 64 above and parallel to each of the driven members 40, these shafts being driven by bevel gears from the shafts 63. Each shaft 64 carries a pinion 65 meshing with an idler pinion 66 on a shaft 67, which pinion 66 engages and drives the pinion 42 on the driven member 40 above described. Thus each end of the spindles is driven from a separate cross shaft 63, but both of these cross shafts 63 are driven by a common means, namely, the shaft 61 which is rotated by the motor 60.

It is believed that the mounting of the spindle 14 and the mechanism for driving it will be clear from the description above. The arrangements for holding the work and for elevating it into cooperative relationship with the milling cutters 15 and 16 on the spindle, will now be described.

It should be understood that in most milling machines, one of the principal causes of breakdowns and excessive wear is the fact that the chips produced during the milling operation are apt to fall into the moving parts of the machine. The mechanism herein disclosed overcomes this difficulty by bringing the work up against the bottom of the cutters and by placing all of the bearings, guiding surfaces, and elevating mechanism above the cutters, so that the chips will fall by gravity away from the parts which they might damage or with which they would interfere.

As one illustration of mechanism embodying these principles, there is shown a movable work-supporting frame 70 suitably guided and gibbed for vertical travel. The front and rear edges of the frame extend down below the central portion thereof, as illustrated in Figure 3, so that when the frame is in its lowered position the spindle is accommodated in the space between the front and rear edges, while these edges extend down past the sides of the spindle. In the forward part of this frame there may be journalled a shaft 71 (see Figures 1 and 3) carrying a pinion 72 at each end thereof, each of these pinions engaging a split rack 73 mounted on the frame of the machine. These racks are split so that they may be accurately adjusted in the well known manner to take up the backlash between the pinions and the racks. When the racks have been properly adjusted, the shaft 71 and the pinions 72 roll smoothly and evenly up and down the racks, and since the shaft 71 is journalled in the frame 70, this insures that the frame shall have a parallel motion and that one end thereof shall not rise faster or farther than the other end.

To hold the work relative to the frame 70, so that the work may be brought into engagement with the milling cutters when the frame is elevated, clamping mechanism may be employed. One form of such mechanism consists of the clamping member 75 extending approximately horizontally below the work-supporting frame 70, one end of the clamping member being pivotally connected to the rear portion of the frame through a member 76. The other end of the clamping member 75 may be pivoted to a member 77 extending upward through a flange 78 which projects outward from the front of the frame 70, perpendicular to the line of travel of the frame. A nut 79 rotatably mounted in the flange 78 and engaging screw threads on the member 77 may be used to raise and lower the member 77, thus moving the forward end of the clamping bar 75 closer to or farther away from the frame 70. This nut 79 could be moved by any suitable means. In the embodiment shown, the flange 78 terminates at its forward end in a second flange 80 approximately perpendicular to the first flange. Journalled in this flange 80 is a shaft 81 carrying at its forward end a hand wheel 82 and at its other end a bevel gear 83 meshing with bevel teeth 84 cut on the nut 79. Rotation of the hand wheel 82 will therefore result in turning the nut 79 and moving the clamping member 75, as will clearly appear from Figure 3.

Bearing blocks 86 may be attached to the under side of the frame 70, the bottoms of these blocks constituting bearing surfaces against which the top edge of the work may be clamped. A lower bearing block 87 may be pivoted at 88 to the clamping member 75, and the work, such as the engine block 20, may rest upon this bearing block 87, and be clamped between it and the bearing surfaces on the under side of the frame 70.

It is desirable to provide a plurality of clamping mechanisms for holding the work if it is large or heavy. It will be seen from Figure 1 that two such clamping mechanisms have been used in this instance, one near each end of the work 20. The two mechanisms are identical with each other, each consisting of the parts 75 to 88 above described.

For convenience in loading and unloading the work, roller conveyors 90 and 91 of standard form may be employed, the work coming along the conveyor 90 into the machine and passing out along the conveyor 91 when it has been finished. As the work moves leftwardly into position to be clamped in the machine, it is stopped by coming into contact with the pivoted stop member 92, which member may be turned over out of the way after the work has been finished, to permit it to be moved away on the conveyor 91.

This stop 92 will locate the work approximately in proper position relative to the clamping mechanism, but in order to aline the work more accurately, special work locating means may be provided. This means may consist of a plurality of movable work locating members in the nature of pins 95 mounted in the frame 70 and having tapered ends which may engage preformed recesses 96 in the top surface of the work 20. The pins may be projected from the frame 70 into the recesses 96 by means of rack teeth formed on the pins and meshing with gear teeth cut on the shafts 97, as shown in Figure 2. These shafts 97 may have operating members in the nature of handles 98, connected by a rod 99 so that movement of either handle will move the other one.

It will be readily understood from the foregoing description that the work 20 may be supported on the clamping members 75 and clamped tightly against the under side of the vertically movable work-supporting frame 70. If the frame then be moved upward, it is obvious that the top of the work will be brought into cooperative relationship with the milling cutters on the spindle 14, and these milling cutters will finish the edges 17 and 18 of the bearings 19. In order to produce this upward motion of the work-supporting frame 70, various means might be employed. One possible form of such means comprises the hydraulic cylinders 105 mounted on the frame 13 of the machine, the pistons 106 within these cylinders being connected through piston rods 107 to portions of the work-supporting frame 70. Therefore, the raising of these pistons, by fluid pressure, will result in raising the work-supporting frame 70, carrying with it the work 20, and bringing this work into engagement with the milling cutters.

To operate the hydraulic cylinders 105, an oil pump 108 of conventional form may be used, this pump being driven in any suitable manner, such as by belting 109 from the shaft 61 above described. The outlet pipes of this oil pump are connected by suitable piping (not shown) with the pipes 110 and 111 (Figures 3 and 4) leading to the tops and bottoms respectively of the hydraulic cylinders 105. A control lever 112, conveniently accessible to the operator, controls the action of the oil pump 108, and enables the motion of the work-supporting frame 70 to be started or stopped when desired.

As the milling takes place, the resulting chips fall downward into the funnel shaped chute 115, and thence into the chip pan 116, from which they may be removed as frequently as necessary. In this connection, it should be especially noted that the machine herein disclosed is free from all the trouble commonly caused by chips in machines of other types. All of the parts of the machine which could be damaged by chips, such as the guiding surfaces for the work-supporting frame 70, the spindle bearings, the piston rods of the hydraulic cylinders, or the racks and pinions 72, 73, are located above the part of the work which is being milled, and therefore are out of the path of the chips as they fall.

The operation of the machine in milling a piece of work will now be briefly described: Assuming that the driving motor 60 is running, so that the spindle 14 is constantly rotating, and that the previous piece of work has been removed from the machine, the next piece of work 20 is moved along the roller conveyor 90 to the machine, and is stopped by coming into contact with the pivoted stop member 92. This locates it approximately in the desired position, but accurate alinement is secured by moving the handles 98 so as to project the work locating pins 95 into the tapered recesses 96 which have been previously formed in the top surfaces of the work 20. When the work has been positioned in this manner, the hand wheels 82 are turned by the operator so as to raise the forward ends of the clamping members 75. During this movement, the bearing blocks 87 will come up against the under side of the work 20, and will take the weight of the work off of the roller conveyor on which it has rested, clamping it firmly against the bottom surfaces of the blocks 86 on the work-supporting frame 70. The work is now free of the conveyor, and supported entirely from the work-supporting frame, this position being illustrated in Figures 3, 4 and 5.

Next, the operator moves the control handle 112 so as to render the pump 108 effective to pump fluid through the lower pipes 111 leading into each of the hydraulic cylinders 105. This will cause the pistons 106 to move upwardly, and since they are attached to the work-supporting frame 70, this frame will likewise be elevated. As it moves up, the pinions 72 will roll over the split racks 73, thus insuring a perfectly parallel motion for the work support. During the upward motion of the work 20, the edges 17 and 18 of the bearings 19 will be brought into cooperative relationship with the milling cutters 15 and 16, and will be milled to the desired extent. The position of the work when at the upward limit of its motion is illustrated in Figure 6.

The milling having been accomplished, the work-supporting frame 70 is then lowered to its initial position, and the hand wheels 82 are turned to unclamp the work. The finished piece of work is then moved off leftward, over the conveyor 91, the pivoted stop 92 first being turned to its ineffective position so that it will not obstruct the removal of the work. The stop is then turned back to its effective position, the next piece of work is moved into place, and the operation is repeated.

As often as may be necessary, the chip pan 116 is drawn out and emptied. Whenever the milling cutters become dull, the spindle may be taken out of the machine in the manner which has been fully described above, and the cutters may be sharpened, or a new spindle with sharp cutters may be substituted.

It will now be seen that a machine has been disclosed which has many advantages and improvements over the machines heretofore used. It is rapid and accurate in operation, easy to keep in order, and simple to operate. Many of the features disclosed herein are applicable to machines of other kinds or types, and it should be understood that such use is contemplated and that protection thereon is desired.

While one embodiment of the invention has been disclosed, it is to be understood that the inventive idea may be carried out in a number of ways. This application is therefore not to be limited to the precise details shown, but is intended to cover all modifications thereof falling within the spirit of the invention or the scope of the appended claims.

We claim:

1. In a milling machine having a frame, the combination with a milling cutter spindle, of a work support located above the spindle and extending downwardly on both sides of its axis, work clamping means connected to the work support on both sides of the spindle axis, and hydraulic means located above the spindle for moving the work support to bring the work into cooperative relationship with said cutter, the work support being guided on the frame on both sides of the spindle axis during its vertical travel.

2. In a machine tool having a frame, the combination with a tool spindle, of a work supporting frame movable transversely to the tool spindle and guided on the machine frame and extending on opposite sides of the spindle axis, a clamping member having one end pivotally connected with said work supporting frame, nut and bolt means connecting the other end of said clamping member with said work supporting frame, and means for turning said nut and bolt relative to each other so as to move said clamping member relative to said frame.

3. In a milling machine comprising a frame, the combination with a milling cutter spindle, of a reciprocable frame mounted above said spindle and extending downwardly and guided on the machine frame on opposite sides of the spindle axis, said frame having a bearing surface, a clamping member connected to said frame below the same, means for moving said clamping member to clamp a work piece between said clamping member and said bearing surface, and hydraulic means for elevating said frame so as to bring said work piece into cooperative relationship with said cutter.

4. In a machine tool, the combination with a cutting tool, of a movable frame, a clamping member having one end pivotally supported with reference to said frame, nut and bolt means connecting the other end of said clamping member with said frame, means for turning said nut and bolt relative to each other so as to clamp a piece of work between said clamping member and said frame, and hydraulic means for elevating said movable frame so as to bring said work into cooperative relationship with said tool.

5. In a machine tool, the combination of a movable work support including a body portion, a flange attached to one side of said body portion and extending approximately perpendicularly to the line of travel of said work support, said flange terminating in a second flange approximately perpendicular to said first named flange, a clamping member mounted upon and movable with respect to said work support, means mounted on said first named flange for moving said clamping member, and means mounted on said second flange for operating said moving means.

6. In a machine tool, the combination of a movable work support including a body portion, a flange attached to one side of said body portion and extending approximately perpendicularly to the line of travel of said work support, said flange terminating in a second flange approximately perpendicular to said first named flange, a connecting member attached to said work support, a clamping member pivotally connected at one end to said connecting member, a second connecting member pivotally connected to the other end of said clamping member and extending through said first named flange, screw threads on said second connecting member, a nut mounted upon said first named flange and engaging said screw threads, gear teeth on said nut, a shaft rotatably mounted on said second flange, a gear on said shaft engaging the gear teeth on said nut, and means for turning said shaft so as to rotate the nut to move the clamping member.

7. In a machine tool, the combination with a frame, of a revoluble cutting tool thereon, a work support movably mounted on said frame above the cutting tool and projecting downwardly on opposite sides thereof and having a bearing surface thereon, a clamping member pivotally connected at one end to the work support, a bearing block pivoted to said clamping member, nut and bolt means connecting the other end of said clamping member with said frame, a pinion for turning said nut and bolt relative to each other so as to move said bearing block toward said bearing surface to clamp a work piece between them, and means for moving the work support to move the work piece into engagement with said tool.

8. In a machine tool, the combination with a spindle, of a supporting member having a plurality of surfaces disposed at an angle to each other, said surfaces being parallel to and spaced from said spindle, and a bearing block engaging said plurality of surfaces, said spindle being journalled in said bearing block.

9. In a machine tool, the combination with a supporting member having two intersecting surfaces, of a spindle parallel to the line of intersection of said surfaces and spaced from one of said surfaces at a point offset from said line of intersection, and a bearing block in which said spindle is journalled, said bearing block being in contact with both of said intersecting surfaces.

10. In a machine tool, the combination with the frame of the machine, of a supporting member having a generally triangular cross-section, said supporting member being fixed on one side to said frame, a spindle parallel to and spaced from another side of said supporting member, and a bearing block in which said spindle is journalled, said bearing block being in contact with said last named side of said supporting member and having a portion in contact also with a surface at an angle to said last named side.

11. In a machine tool, the combination with a spindle, of a supporting member having an angular edge parallel to said spindle, a bearing block in which said spindle is journalled, said bearing block being in contact with and extending along said supporting member in two directions from said angular edge, and means for fixing said bearing block to said supporting member.

12. In a machine tool, the combination with a spindle, of a supporting member having an angular edge parallel to said spindle, a bearing block in which said spindle is journalled, said bearing block being in contact with and extending along said supporting member in two directions from said angular edge, and means for fixing said bearing block to said supporting member, said means passing between said spindle and said angular edge.

13. In a machine tool, the combination with a spindle, of a supporting member having a plurality of surfaces disposed at an angle to each other, said surfaces being parallel to and spaced from said spindle, a bearing block engaging said plurality of surfaces, said spindle being journalled in said bearing block, and means exerting force on said block in a direction tending to keep it in contact with all of said surfaces.

14. In a machine tool, the combination with a movable work support, of hydraulic means at the top of the machine for moving said work support, a pump for operating said hydraulic means, a driving motor, a horizontally disposed shaft at the rear of the machine above said motor and operatively connected therewith, means for driving said pump from said shaft, a spindle located under said hydraulic means at the front of the machine, cutting means mounted upon said spindle adapted to operate on a piece of work carried by said movable work support and located beneath the spindle, a forwardly extending shaft at each end of the machine operatively connected to said horizontally disposed shaft, and means for driving said spindle from each of said forwardly extending shafts.

15. In a machine tool, the combination with a hollow driven member, of a spindle in axial alinement therewith means connecting the spindle with the driven member, a recess in the end of said spindle, a movable retaining member mounted within said driven member, a cam slot in one of said members, and a pin on the other of said members extending into said cam slot, whereby turning of said retaining member in one direction or the other relative to the driven member will cause it to project into the recess in said spindle or to be withdrawn from said recess.

16. In a machine tool, the combination with a hollow driven member, of a spindle in axial alinement therewith, means connecting the spindle with the driven member, a recess in the end of said spindle, a hollow retaning member mounted within said driven member, a cam slot in one of said members and a pin on the other of said members extending into said cam slot, whereby turning of said retaining member in one direction or the other relative to said driven member will cause it to project into the recess in said spindle or to be withdrawn from said recess, and a removable locking member normally attached to said spindle and extending through said hollow retaining member, said locking member having a portion in engagement with said retaining member to hold the latter in its effective position wherein it projects into said recess.

In witness whereof, we have hereunto signed our names.

WORTHY J. F. FORWARD.
ROLAND RUSSELL ROBERTS.